United States Patent [19]

Kallies et al.

[11] Patent Number: 4,811,540

[45] Date of Patent: Mar. 14, 1989

[54] FIBER REINFORCED SHELL STRUCTURE OF SYNTHETIC MATERIAL

[75] Inventors: Guenter Kallies; Dieter Scheidemann, both of Hamburg, Fed. Rep. of Germany

[73] Assignee: Messerschmitt-Boelkow-Blohm GmbH, Munich, Fed. Rep. of Germany

[21] Appl. No.: 43,082

[22] Filed: Apr. 27, 1987

[30] Foreign Application Priority Data

Apr. 30, 1986 [DE] Fed. Rep. of Germany ....... 3614618

[51] Int. Cl.[4] .......................... E04C 2/38; B64C 1/06; B32B 3/20
[52] U.S. Cl. ..................... 52/630; 244/123; 428/119
[58] Field of Search .................. 52/309.1, 309.3, 309.4, 52/309.14, 807, 630, 782, 785, 809, 818, 817; 244/120–124; 428/120, 123, 119

[56] References Cited

U.S. PATENT DOCUMENTS

| | | | |
|---|---|---|---|
| 2,230,393 | 2/1941 | Thomson | 52/309.1 |
| 3,096,958 | 7/1963 | Koontz | 244/123 |
| 3,616,113 | 10/1971 | Sawyer | 428/120 |
| 3,995,080 | 11/1976 | Cogburn et al. | 52/630 |
| 4,109,435 | 8/1978 | Loyd | 52/309.1 |
| 4,339,487 | 7/1982 | Mullet | 52/309.4 |
| 4,512,837 | 4/1985 | Sarh et al. | 52/84 |
| 4,524,556 | 6/1985 | Sarh et al. | 156/350 |
| 4,715,560 | 12/1987 | Loyek | 244/123 |

Primary Examiner—James L. Ridgill, Jr.
Attorney, Agent, or Firm—W. G. Fasse; D. H. Kane, Jr.

[57] ABSTRACT

A fiber reinforced shell structure of synthetic material has an outer skin supported on a skeleton of longitudinal stringers interconnected by ribs. The stringers have a channel cross-section filled with a hard foam. The ribs have an approximately [ or I-shaped cross-section. The ribs are formed by an outer chord and by an inner chord interconnected by a web. If the structure is cylindrical, for example, the ribs extend circumferentially. The rib webs are made of rib web segments which are displaced relative to each other, for example in the circumferential direction in case of a cylindrical structure. The displacement of the web elements corresponds to the on-center spacing between neighboring longitudinal stringers, whereby the fiber reinforced material of the end portions of the rib web segments merge into rib reinforcing or bracing members, where the ribs intersect the stringers. The rib bracing members alternate in opposite directions along a rib and are filled with a hard foam. Such a shell structure can be manufactured with the aid of mold members made substantially of rubber elastic material which greatly facilitates the removal of the mold members from a finished structure, such as an aircraft body.

8 Claims, 5 Drawing Sheets

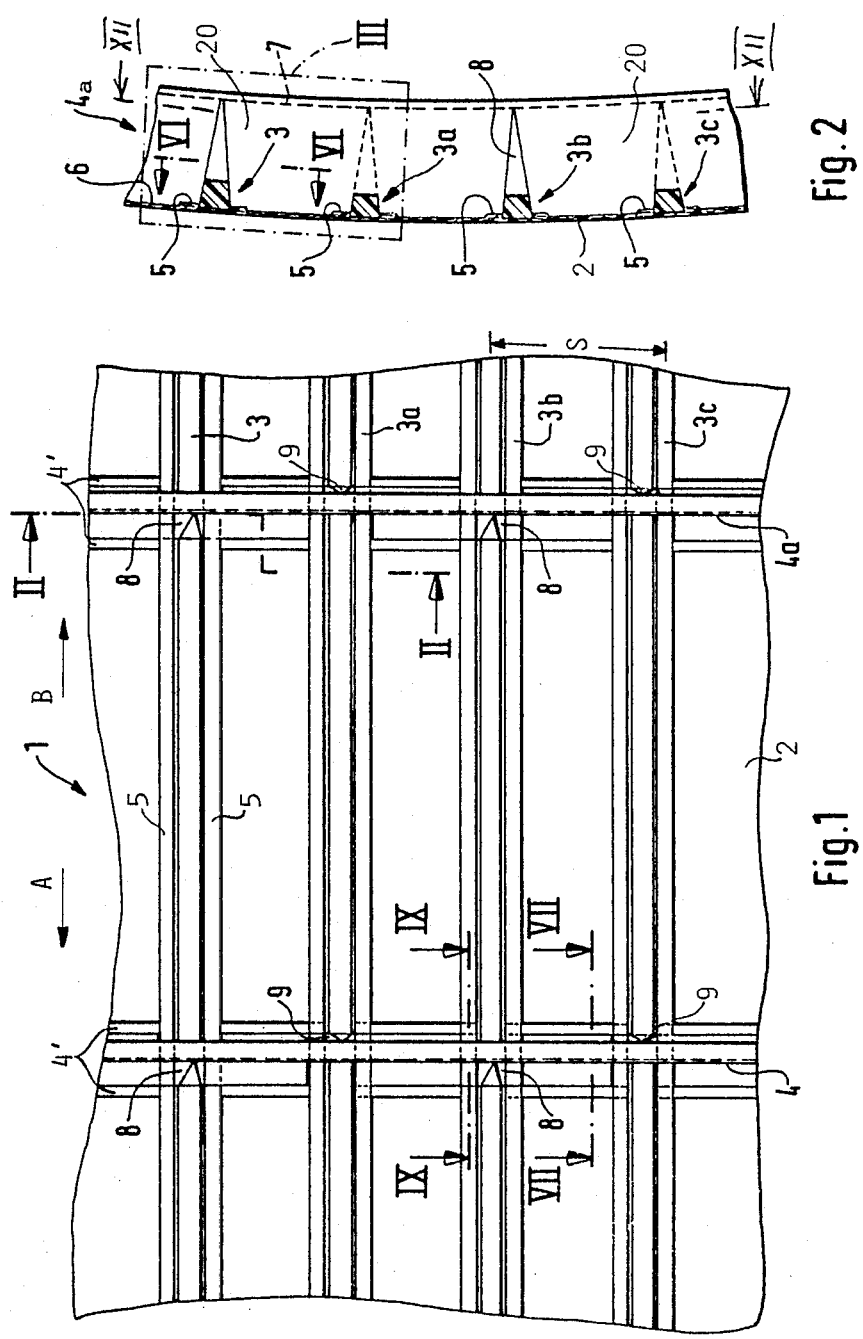

FIBER REINFORCED SHELL STRUCTURE OF SYNTHETIC MATERIAL

FIELD OF THE INVENTION

The invention relates to a fiber reinforced shell structure of synthetic material such as an aircraft fuselage, an aircraft wing, or the like.

DESCRIPTION OF THE PRIOR ART

Such structural components and ways of manufacturing these components are disclosed in U.S. Pat. Nos. 4,524,556 (Sarh et al) and 4,512,837 (Sarh et al) corresponding to German Pat. No. 3,003,552. These structural components have, for example, a cylindrical shape formed by a skeleton of longitudinal stringers interconnected by circumferential ribs with an outer skin bonded to the stringers and ribs. The stringers may have a channel type cross-sectional configuration while the ribs may have approximately an I-cross-section configuration with an outer and inner chord interconnected by a web. Each web surface faces toward an end of the structural component. Thus, in an aircraft body one rib web surface would face toward the nose tip of the fuselage, while the other rib web surface would face toward the tail end.

The skeleton functions as a stiffening grid structure comprising said longitudinal stringers and the cross ribs, whereby the entire frame structure is assembled from box frames manufactured in a winding operation, whereby preimpregnated fiber reinforced synthetic material tapes are wound onto form bodies and cured. The form bodies are then removed after curing. The desired structure or shape of the structure is achieved by assembling a plurality of wound box frames and molding these frames in a molding apparatus prior to curing, whereby the form bodies are still inside the box frames. These form bodies must be manufactured as separate components and are at least partially made of a suitable metal that requires a chip removing machining operation. As a result, the manufacturing costs which must include the costs for making the form bodies are rather high.

OBJECTS OF THE INVENTION

In view of the foregoing it is the aim of the invention to achieve the following objects singly or in combination:

to modify the stringer and rib construction in such a way that the manufacture will require less expensive machinery;
to simplify the skeleton structure, that is the stringer and rib structure, without reducing the strength of such a structure, while also avoiding expensive mold bodies; and
to construct or assemble the ribs either of two types of rib elements or rib segments, whereby one type of rib segments faces toward one end of the structural component while the other type of rib segment or element faces toward the opposite end of the structural component, or to use the same type of rib segments for the rib construction so that it becomes immaterial whether a rib segment faces in one or the other direction.

SUMMARY OF THE INVENTION

The shell structure according to the invention is characterized in that each rib which interconnects the longitudinal stringers comprises a plurality of rib segments or elements, whereby one type of rib segments faces toward one end of the structural component while another type of rib segments faces toward the opposite end of the structural component and wherein these rib segments are angularly displaced relative to each other in the circumferential direction, the respective displacement corresponding to an on-center spacing between neighboring stringers. Additionally, rib bracing members are located so that the ends of the rib segments can merge into the rib bracing members which are preferably located where the stringers join the ribs.

In a preferred embodiment the fiber reinforced shell structure comprises longitudinal stringers and circumferential ribs interconnecting the stringers to form a skeleton having a laminated outer skin, wherein the ribs include an outer chord and an inner chord interconnected by a web and wherein rib bracing members are located on either side of the web for connecting the stringers to the ribs. The web comprises a plurality of web elements, each web element having a main portion with a flat back and an end portion at each end of the main portion, whereby the end portions extend away from the flat back. The web elements are arranged in two groups so that the end portions of one group point in one direction and the end portions of the other group of web elements point in the opposite direction. The web elements are so positioned in a back-to-back arrangement or relationship that the web elements of one group are angularly displaced in the circumferential direction relative to the web elements of the other group, whereby the end portions of one group of web elements are staggered relative to the end portions of the other group of web elements so that the web end portions merge into the rib bracing members.

The advantages achieved according to the invention are primarily seen, among others, in that the mold bodies can now be substantially simpler without requiring any machining operations. These mold bodies may be made substantially of a rubber elastic material which facilitates their removal from the finished grid structure. Additionally, the number of laminates which heretofore had to be manufactured separately, has been reduced.

BRIEF DESCRIPTION OF THE DRAWINGS

In order that the invention may be clearly understood, it will now be described, by way of example, with reference to the accompanying drawings, wherein:

FIG. 1 is a plan view of a fragment of a shell structure having a substantially cylindrical configuration with the direction of view radially outwardly from the inside of the shell structure, whereby any inner skin has been omitted;

FIG. 2 is a sectional view along the section line II—II in FIG. 1;

Figure 3:
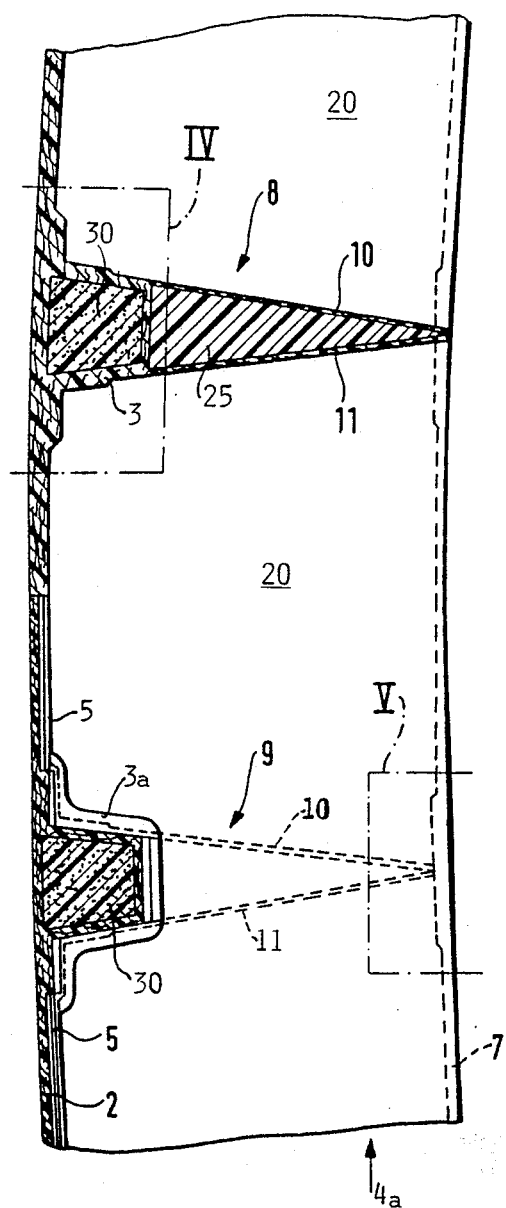
FIG. 3 shows portion III of FIG. 2 on an enlarged scale and rotated clockwise by 90°.

DETAILED DESCRIPTION OF PREFERRED EXAMPLE EMBODIMENTS AND OF THE BEST MODE OF THE INVENTION

Referring to FIGS. 1 and 2, the present shell structure 1 comprises a plurality of longitudinally extending stringers 3, 3a, 3b, 3c, and so on. These stringers extend substantially in parallel to one another and are spaced from one another by an on-center spacing S. If the shell structure is cylindrical, the spacing S extends in the circumferential direction. The stringers are interconnected by ribs 4, 4a, and so forth. Each stringer 3, 3a, . . . has lateral flanges 5 which are bonded to the outer skin 2, for example, as a result of the curing of the fiber reinforced synthetic material. The ribs 4, 4a, . . . have radially outer chords 4' which are also bonded to the outer skin 2 by the curing of the synthetic material. In FIG. 1 the arrow A points toward one end of the shell structure, for example, the nose cone of an aircraft fuselage while the arrow B points in the opposite direction, for example, toward the tail end of the aircraft fuselage. Thus, the surface of a rib web 20 of the rib 4a as viewed in the direction of the sectional plane II—II in FIG. 1, faces in the direction of the arrow A, for example, toward the nose cone.

Figure 12:
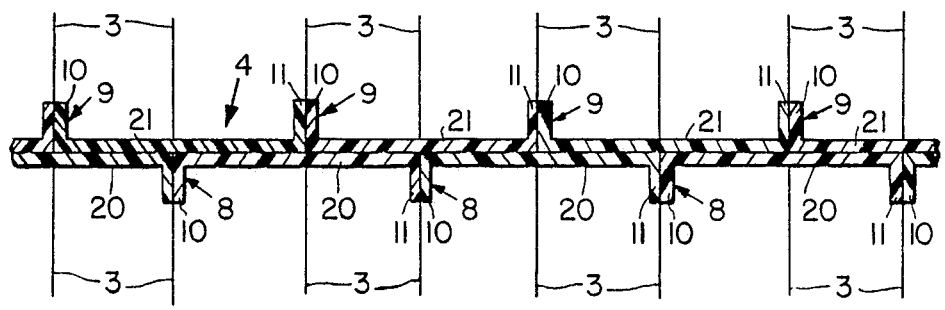
FIG. 12 is a schematic illustration substantially along section line XII—XII in FIG. 2 and projecting the alternate arrangement of the rib segments into the flat plane of the drawing sheet to show the staggering of the rib segments and alternating rib bracing members.

At the intersections between a rib 4 and a stringer 3 there are arranged rib bracing members 8 and 9 located on alternately opposite sides of the respective rib as best seen in FIGS. 1 and 12. Thus, the rib bracing members 8 are located at every other stringer 3 on one side of a rib 4 and the bracing members 9 are located at every other stringer 3 on the other side of the same rib, but staggered from stringer to stringer, e.g. in the circumferential direction of a cylindrical shell relative to the bracing members 8. FIG. 12 also shows that each rib comprises two groups of rib web segments 20, 21. The first group is located on the side having the rib bracing members 8. The second group is located on the side having the rib bracing members 9. The first group comprises the rib web segments 20 and the second group comprises the rib web segments 21. Each rib web segment 20 and 21 has a flat back or main portion and end portions 10, 11 extending away from the main portion. The main portions are arranged back-to-back but in the staggered relationship e.g. in the circumferential direction of a cylindrical shell as seen in FIG. 12. The staggering corresponds to the spacing S.

FIG. 3 shows on an enlarged scale the detail III in FIG. 2, whereby the construction of the rib bracing members 8 and 9 appears in greater detail. The rib bracing member 8 appears in front of the rib web segment 20 while the rib bracing member 9 is shown in dashed lines because it appears behind the rib web segments 20, 21. The end portions 10 and 11 of neighboring rib web segments 20, 21 merge into the respective rib bracing members 8, 9, and thereby form these rib bracing members 8, 9, preferably together with a hard foam core 25, please see FIG. 6. As seen in FIG. 3 the rib bracing members 8 and 9 taper away from the outer skin 2.

Figure 9:
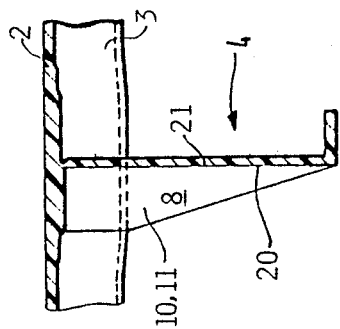
FIG. 9 is a sectional view through another type of rib web segment along section line IX—IX in FIG. 1.

The rib bracing members 8, 9 also merge into the respective stringer 3, 3a at an intersection or junction between a rib and a stringer. The channels formed by the stringers 3 are filled with a hard foam core 30. The space between the end portions 10, 11 of the rib web segments 20, 21 is filled with the above mentioned hard foam core 25 to form the rib bracing members 8, 9. As shown in FIG. 9, the end portions 10, 11 of the rib web segments 20 may have a triangular lower portion.

Figure 4:
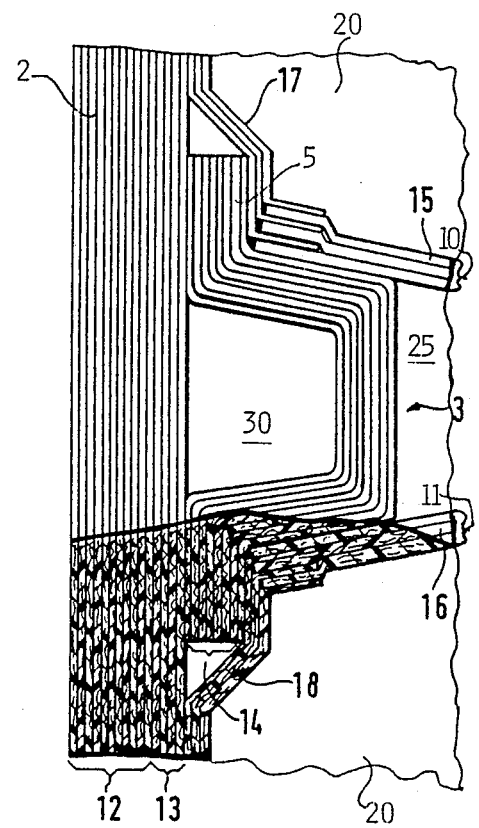
FIG. 4 is a further enlarged view of portion IV in FIG. 3, partially as end view and partially in a section illustrating the laminations of the outer skin, of the stringer, and of the web segment end portions merging into a rib bracing member.

FIG. 4 shows schematically the layer arrangement of a junction between the rib web segment 20 of a rib 4 with its core 25 and a stringer 3 with its core 30. The layers are individual preimpregnated layers of fiber reinforced material. The layers 12 form the outer skin 2. The layers 13 form part of a rib chord. The layers 14 form the lateral flanges 5 of the channel shaped stringer 3. The layers 15 form the end portion 10 of a rib web segment 20. The layers 16 form the end portion 11 of a neighboring rib web segment 20. Thus, these layers 15 and 16 together with the core 25 form the rib bracing member 8, please see FIG. 3. The rib web segment 21 is layered in the same way.

Figure 5:
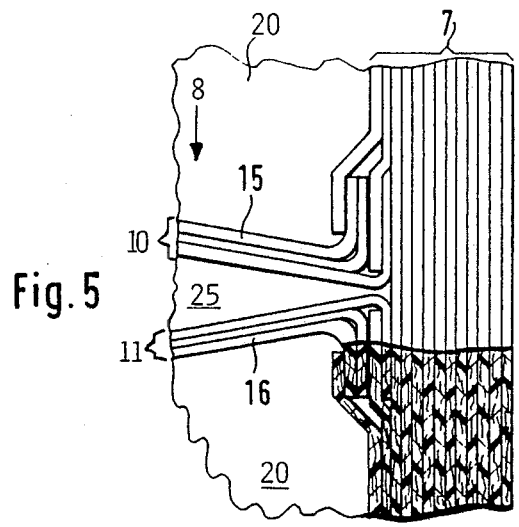
FIG. 5 is a still further enlarged view of portion V in FIG. 3, partially in section and partially as an end view illustrating the laminations of the web segment end portions merging into the laminations of an inner skin or of an inner rib chord.

FIG. 5 shows the radially inner end of a rib bracing member 8, 9 merging with the end portions 10 and 11 of the respective rib web segments 20 and with the layers 7 forming the lower chord of the rib web segments 20. These layers 7 just as the layers 13, may be continuous tapes. This applies also to the layers 12. The layers 13 form the upper chord of the rib web segments 20, 21.

Figure 6:
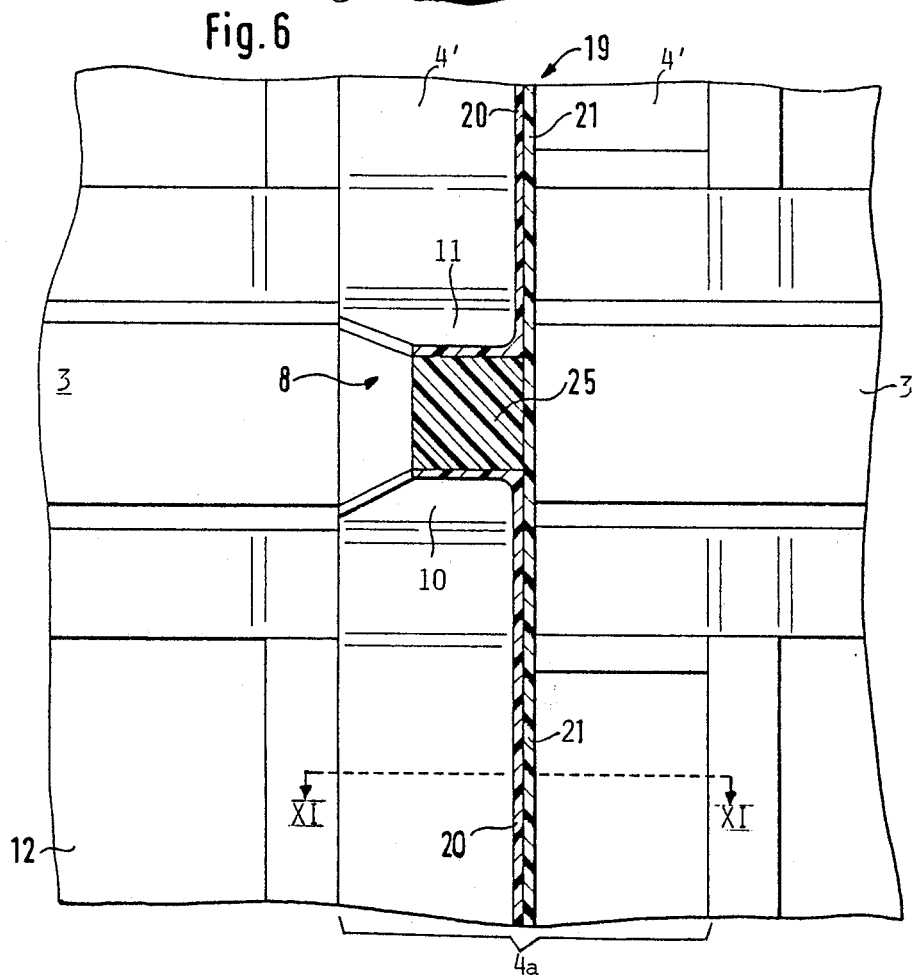
FIG. 6 is a sectional view along section line VI—VI in FIG. 2, but on an enlarged scale.

FIG. 6 shows a sectional view along section line VI—VI in FIG. 2, whereby the web 19 of a rib 4a is formed by the above described rib web segments 20 and 21 also shown in their general arrangement in FIG. 12. The rib web segments 20 face, for example, toward the nose cone and the rib web segments 21 face, for example, toward the tail end of an aircraft fuselage as mentioned above with reference to the arrows A and B in FIG. 1. The arrangement of the rib web segment end portions 10 and 11 as they merge into the rib bracing member 8 is also shown in more detail in FIG. 6, whereby the hard foam core 25 is embraced by the end portions 10 and 11 of the rib web segment 20 and by the back of a staggered rib web section 21. As seen in FIG. 12, the rib bracing members 8 are located to the left of rib 4, while rib bracing members 9 are located to the right of rib 4.

Figure 7:
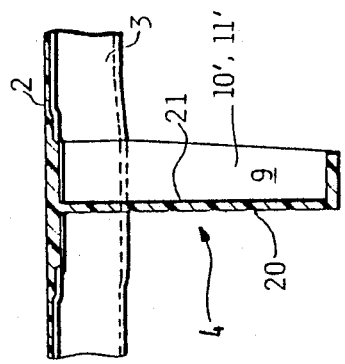
FIG. 7 is a sectional view along section line VII—VII in FIG. 1 and showing one type of web segment.

FIG. 7 shows another type of web section element 21 in which the end portions 10', 11' have a somewhat trapezoidal shape rather than a triangular shape as shown in FIG. 9.

Figure 8:
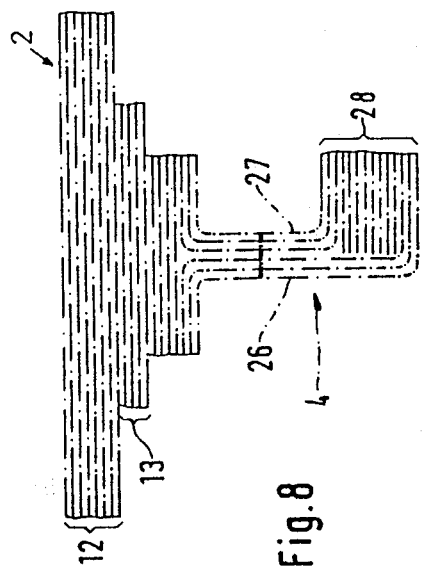
FIG. 8 illustrates on a somewhat enlarged scale, the laminate structures of the web segment and chords according to FIG. 7.

FIG. 8 shows the individual fiber layers 12 and 13 of the outer skin 2 and of the radially outer rib chord 13. Preferably, the layers 13 are formed by one continuous tape wound around the rib web segments. Layers 26 form the rib web segments 20. Layers 27 form the rib web segments 21. Layers 28 form the radially inner chord, whereby again continuous tapes are preferred.

Figure 10:
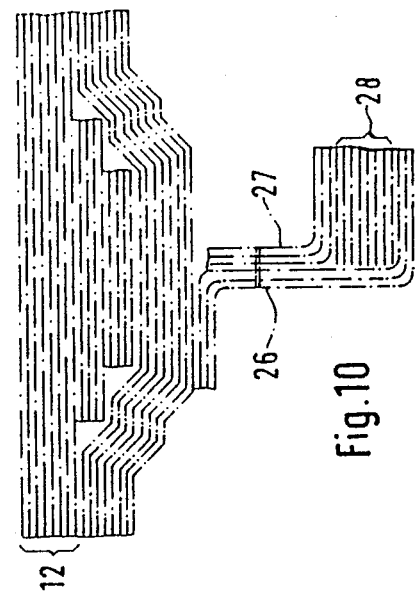
FIG. 10 shows schematically the laminations of the web segment of FIG. 9.

FIG. 9 shows the section IX—IX in FIG. 1, whereby the embodiment shows the rib bracing member 8 left of rib 4. FIG. 10 illustrates the individual layers 26, 27 forming the rib web segments 20 and 21, respectively.

Figure 11:
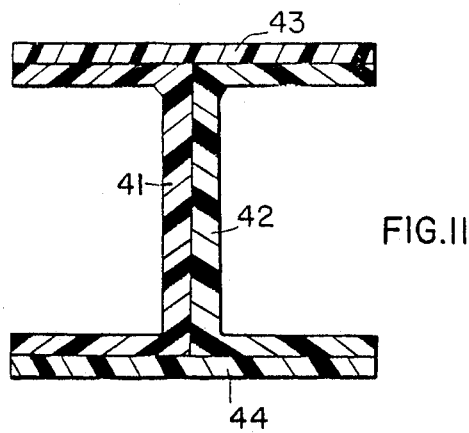
FIG. 11 is a sectional view substantially along section line XI—XI in FIG. 6.

FIG. 11 shows a rib configuration having an I-section made of a left ]-section 41, a right [-section 42, an upper chord 43, and a lower chord 44.

Although the invention has been described with reference to specific example embodiments, it will be appreciated that it is intended to cover all modifications and equivalents within the scope of the appended claims.

What we claim is:

1. A fiber reinforced shell structure, comprising longitudinal stringers and ribs interconnecting said stringers to form a skeleton, each of said stringers having a channel shape including lateral flanges along each edge of said channel shape and a hard foam insert in said channel shape, a laminated outer skin covering said skeleton including said lateral flanges, said ribs including an outer chord, an inner chord, and rib web means interconnecting said inner and outer chords to form a rib, and rib bracing means (8,9) for bracing said ribs, said rib bracing means being located on both sides of said rib web means, said rib bracing means being connected to said longitudinal stringers, said rib web means comprising a plurality of rib web segments (20, 21), each rib web segment having a main portion with a flat back and an end portion (10, 11) at each end of said main portion, said end portions of said rib web segments extending away from said flat back, said rib web segments being arranged in two groups so that the end portions of one group of rib web segments point in one direction and the end portions of the other group of rib web segments point in an opposite direction, said rib web segments being positioned in a back-to-back arrangement and so that the rib web segments (20) of one group are displaced relative to the rib web segments (21) of the other group, whereby said end portions (10, 11) of one group of rib web segments are staggered relative to the end portions of the other group of rib web segments, said web end portions forming said rib bracing means (8, 9) which taper away from said outer skin covering.

2. The structure of claim 1, wherein said rib bracing means (8, 9) comprise a hard foam core (25) enclosed on opposite sides by said end portions of said rib web segments (20, 21).

3. The structure of claim 1, wherein said rib bracing means are located on alternate opposite sides of said rib web means.

4. The structure of claim 1, wherein said rib bracing means are located at intersections of said stringers and said ribs and so that one end of a stringer merges into said rib bracing means.

5. The structure of claim 1, further comprising an inner skin bonded to said radially inner chords of said ribs.

6. The structure of claim 1, wherein said rib web segments each have approximately a [-cross-section so that said back-to-back arrangement results in a substantially I-shaped cross-sectional rib web configuration.

7. The structure of claim 1, wherein said stringers, chords, rib web segments, and rib bracing means comprise fiber reinforced resin impregnated layers which overlap where layers merge into each other.

8. The structure of claim 1, wherein said stringers (3) have a height in the direction of said ribs, which height is substantially smaller than a height of said rib web segments.

* * * * *